(12) United States Patent
Iijima et al.

(10) Patent No.: US 6,223,522 B1
(45) Date of Patent: May 1, 2001

(54) COMBINED CYCLE POWER PLANT AND METHOD USING BOTH LIGHT AND HEAVY OILS

(75) Inventors: Masaki Iijima; Kazuto Kobayashi; Masahumi Moriwaki; Masatoshi Shibata; Yoshinori Hyakutake, all of Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/532,152

(22) Filed: Mar. 21, 2000

(30) Foreign Application Priority Data

Mar. 25, 1999 (JP) .................................................. 11-081384

(51) Int. Cl.[7] ................................. F02C 3/20; F02C 6/18
(52) U.S. Cl. ................... 60/39.02; 60/39.182; 60/39.463
(58) Field of Search .............................. 60/39.02, 39.182, 60/39.461, 39.463

(56) References Cited

U.S. PATENT DOCUMENTS 2,681,694 * 6/1954 Loft .................................... 60/39.463
5,052,175 * 10/1991 Brueckner et al. ............... 60/39.463

FOREIGN PATENT DOCUMENTS 7-208111 * 8/1995 (JP) .

* cited by examiner

Primary Examiner—Louis J. Casaregola
(74) Attorney, Agent, or Firm—Anderson, Kill & Olick P.C.

(57) ABSTRACT

A light oil component is mixed with a heavy oil component so that the kinematic viscosity is not higher than 800 centistokes, the light oil component and the heavy oil component are separated from each other after the mixed oil is transported to a power generation apparatus, and power generation is carried out by burning the light oil component by means of a gas turbine in the power generation apparatus and by burning the heavy oil component by means of a boiler in the power generation apparatus.

3 Claims, 1 Drawing Sheet

COMBINED CYCLE POWER PLANT AND METHOD USING BOTH LIGHT AND HEAVY OILS

BACKGROUND OF THE INVENTION

Field of the Invention

The present invention relates to a high-efficiency power generation method and a high-efficiency power generation system, which use a heavy oil component and a light oil component as a fuel.

Conventionally, a heavy oil component such as tar pitch, Orinoco tar, or residue oil is unsuitable as a gas turbine fuel, so that it has found limited use in power generation of boiler/steam turbine system. Therefore, it is difficult to use a heavy oil component for a power generation system with high thermal efficiency such as a full fired heat recovery power plant in which a gas turbine and a boiler/steam turbine system are combined.

From the viewpoint of resource saving, it has been desired that such a fuel be capable of being used for a high-efficiency power generation system such as a full fired heat recovery power plant.

SUMMARY OF THE INVENTION

The present invention has been accomplished in view of the above situation, and an object thereof is to provide a high-efficiency power generation method and a high-efficiency power generation system, in which a heavy oil component with high kinematic viscosity such as tar pitch, Orinoco tar, or residue oil can be transported to a power plant and can be used for a high-efficiency power generation apparatus such as a full fired heat recovery power plant.

Thus, in accordance with the present invention there is provided a high-efficient power generation method in which a light oil component is mixed with a heavy oil component so that the kinematic viscosity is not higher than 800 centistokes, the light oil component and the heavy oil component are separated from each other after the mixed oil is transported to a power generation apparatus, and power generation is carried out by burning the light oil component by means of a gas turbine in the power generation apparatus and by burning the heavy oil component by means of a boiler in the power generation apparatus. In this high-efficiency power generation method, a full fired heat recovery system can be used in which exhaust gas from a gas turbine is used as combustion air for a boiler.

Also, a high-efficiency power generation system in accordance with the present invention comprises a mixing apparatus for mixing a light oil component with a heavy oil component, transportation means for transporting a mixed oil mixed by the mixing apparatus to a power generation apparatus, a separation apparatus for separating the transported mixed oil into a light oil component and a heavy oil component, a gas turbine for burning the separated light oil component and thereby for generating power, and a boiler for generating steam used to burn the separated heavy oil component and thereby to generate power.

Accordingly, the present invention provides a high-efficiency power generation method and a high-efficiency power generation system, in which a heavy oil component such as tar pitch, Orinoco tar, or residue oil can be used for a high-efficiency power generation apparatus such as a full fired heat recovery power plant.

BRIEF DESCRIPTION OF THE DRAWING

A high-efficiency power generation method in accordance with the present invention will be described with reference to an embodiment shown in the accompanying drawing.

DETAILED DESCRIPTION OF THE PREFERRED EMBODIMENT

Figure 1:
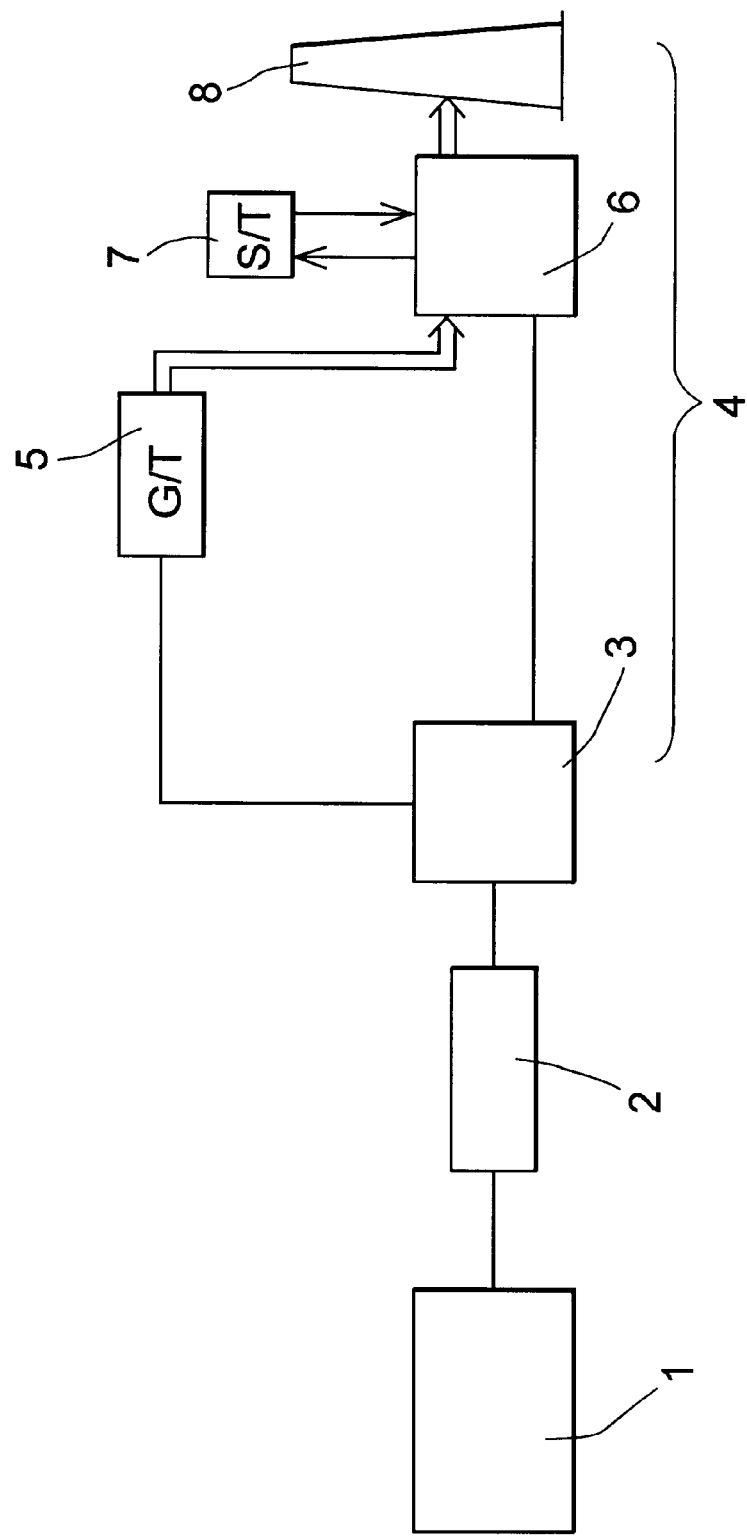
FIG. 1 is a schematic diagram showing the outline of a system for carrying out a high-efficiency power generation method in accordance with the present invention.

The system of this embodiment has main components of a mixing apparatus 1, transportation means 2, and a power generation apparatus 4 including a separation apparatus 3.

The mixing apparatus 1 is an apparatus for mixing a light oil component with a heavy oil component so that the kinematic viscosity is not higher than 800 centistokes, preferably not higher than 400 centistokes. In the present invention, a light oil component is defined as kerosene, light oil, or an oil having properties equivalent to those of these oils. The light oil component is supposed to contain inevitable impurities. By mixing a light oil component with a heavy oil component in the mixing apparatus 1 in this manner, the kinematic viscosity of the heavy oil component can be reduced, so that the heavy oil component can be transported easily. Depending on the environmental conditions in transportation, heating means or other means may additionally used appropriately to obtain a proper kinematic viscosity.

In the present invention, a heavy oil component is defined as a combustible oil component which has a very high kinematic viscosity and is unsuitable for transportation as it is, such as tar pitch, Orinoco tar, or residue oil, or a mixture of these components.

Tar pitch is produced as a by-product when crude oil is subjected to decomposition reaction such as thermal decomposition or catalytic cracking.

Orinoco tar will be explained here because it has received special attention.

In a sedimentary basin called Orinoco Belt located in a north river basin in the province of Orinoco in Venezuela, abundant super-heavy oil (Orinoco tar) is deposited. According to the investigation made in 1984 and before, the minable reserves are estimated to amount to an enormous quantity of 267 billion barrels even if the recovery percentage is assumed to be an average 22%. Incidentally, the minable reserves of crude oil in the world are 648.5 billion barrels.

This Orinoco tar has a property of solidifying at normal temperature. In order to use it as a fuel for thermal power generation, it must be stored at a high temperature and sprayed through a burner after being heated to a temperature of about 200° C. by means a heater. For this reason, Orinoco tar is not used positively. However, Orimulsion is very attractive as one of diversified non-petroleum energy sources: it is lower in cost than heavy crude oil and has less ash than coal. Also, it has an expected advantages as compared with coal in terms of over-all economical efficiency, and therefore it has received attention as a new type of fuel.

As the mixing apparatus 1, an apparatus which is provided with an agitator in a vessel or an apparatus in which agitation is made by a static mixer in a pipe is used.

In order to mix Orinoco tar with kerosene or light oil, it is preferable that mixing operation be performed under an operation condition in which Orinoco tar is heated to reduce the viscosity, is mixed with kerosene or light oil, and is cooled to normal temperature.

The transportation means 2 is means for transporting the mixed oil to the power generation apparatus, and includes a transportation vehicle such as a tank lorry for transportation, a pipeline, and the like.

The separation apparatus 3 is an apparatus for separating the mixture into a light oil component and a heavy oil component by a separating operation. As the separating operation, a distilling operation is generally performed. As the separation apparatus 3, both of a heater or a heating oven and a distilling column are most generally used.

The power generation apparatus 4 includes the aforementioned separation apparatus 3. A full fired heat recovery power plant, in which a gas turbine 5, a boiler 6, and a steam turbine 7 are combined, is best suitable as the power generation apparatus 4. The gas turbine 5 is supplied with the light oil component separated by the separation apparatus 3, and the boiler 6 is supplied with the heavy oil component. These oil components are burned to carry out power generation.

Sodium, vanadium, potassium, and other ingredients contained in the fuel are harmful to the gas turbine. In particular, sodium and vanadium are affected each other, and thereby reduce the melting point of blade metal of the gas turbine, or cause ash to adhere to the blades. Therefore, these ingredients should rightly be removed from kerosene and light oil. However, because distillation is carried out after the light oil component is mixed with the heavy oil component, almost all ingredients harmful to the gas turbine transfer to the side of the heavy oil component, resulting in no trouble.

To carry out power generation, the gas turbine 5 is supplied with the light oil component as a fuel, and the boiler 6 is supplied with the heavy oil component as a fuel. These oil components are burned to carry out power generation.

In the gas turbine 5, air is taken in from the compression side, the light oil component is burned in a combustion chamber and is fed to the expansion side, and a gas turbine exhaust gas is fed into the boiler 6. By the rotation of this gas turbine 5, a generator is rotated to carry out power generation. The boiler 6 burns the heavy oil component by using the gas turbine exhaust gas in place of air. This is so-called a full fired heat recovery system.

As the steam system for the boiler 6, a high-pressure reheat system can be used. In this boiler 6, feed water flows, and exhaust heat is recovered.

The steam from the boiler 6 is supplied to the steam turbine 7, by which the steam turbine 7 is rotated. By the rotation of this steam turbine 7, a generator is rotated to carry out power generation.

The exhaust gas from the boiler 6 is finally discharged through a smoke stack 8.

In the present invention, as described above, the heavy oil component such as tar pitch, Orinoco tar, or residue oil can be utilized in the high-efficiency power generation method in, for example, a full fired heat recovery power plant. Also, kerosene and light oil enabling the heavy oil component to be transported can be used as it is as a fuel for the gas turbine after being separated. Moreover, because harmful substances transfer to the heavy oil component, the fuel does not damage the gas turbine.

The present invention is not limited to the above-described embodiment but can be subjected to various modifications within a range of the technical idea of the present invention.

The disclosure of Japanese Patent Application No.11-081384 filed on Mar. 25, 1999 including specification, claims, drawings, and summary are incorporated herein by reference with its entirety.

What is claimed is:

1. A high-efficient power generation method in which a light oil component is mixed with a heavy oil component so that the kinematic viscosity is not higher than 800 centistokes, the light oil component and the heavy oil component are separated from each other after the mixed oil is transported to a power generation apparatus, and power generation is carried out by burning the light oil component by means of a gas turbine in the power generation apparatus and by burning the heavy oil component by means of a boiler in the power generation apparatus.

2. The high-efficiency power generation method according to claim 1, wherein a full fired heat recovery system is used in which exhaust gas from a gas turbine is used as combustion air for a boiler.

3. A high-efficiency power generation system comprising a mixing apparatus for mixing a light oil component with a heavy oil component, transportation means for transporting a mixed oil mixed by the mixing apparatus to a power generation apparatus, a separation apparatus for separating the transported mixed oil into a light oil component and a heavy oil component, a gas turbine for burning the separated light oil component and thereby for generating power, and a boiler for generating steam used to burn the separated heavy oil component and thereby to generate power.

* * * * *